United States Patent
Chen et al.

(10) Patent No.: US 10,838,288 B2
(45) Date of Patent: *Nov. 17, 2020

(54) PROJECTION APPARATUS AND IMAGING MODULE THEREOF

(71) Applicant: Coretronic Corporation, Hsin-Chu (TW)

(72) Inventors: Wei-Hao Chen, Hsin-Chu (TW); Shu-Yu Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,177

(22) Filed: May 2, 2019

(65) Prior Publication Data

US 2020/0004124 A1 Jan. 2, 2020

(30) Foreign Application Priority Data

Jun. 29, 2018 (CN) .......................... 2018 1 0693754

(51) Int. Cl.
*G03B 21/20* (2006.01)
*G02B 27/09* (2006.01)
*G03B 21/14* (2006.01)

(52) U.S. Cl.
CPC ..... *G03B 21/2006* (2013.01); *G02B 27/0955* (2013.01); *G02B 27/0977* (2013.01); *G03B 21/142* (2013.01)

(58) Field of Classification Search
CPC .............. G02B 26/008; G02B 7/00–40; G02B 27/00–648; G03B 21/00–64; H04N 9/00–898; H04N 9/31–3197; G09G 3/007
See application file for complete search history.

(56) References Cited

U.S. PATENT DOCUMENTS

| 2016/0227177 A1* | 8/2016 | Mizoguchi | ........... G03B 21/142 |
| 2017/0272717 A1* | 9/2017 | Nishizawa | ......... G02B 26/0816 |

FOREIGN PATENT DOCUMENTS

| TW | I376564 B1 | 11/2012 |
| TW | 201723631 A | 7/2017 |

\* cited by examiner

*Primary Examiner* — Michelle M Iacoletti
*Assistant Examiner* — Christopher A Lamb, II

(57) ABSTRACT

An imaging module includes a display element and an image displacement device. The display element includes an active display surface adapted to receive an illumination beam, convert the illumination beam into an image beam, and transmit the image beam. The image displacement device includes an optical element located on a transmission path of the image beam and adapted to allow the image beam to pass therethrough, a carrier, a base and at least one actuator, wherein the optical element is disposed on the carrier, the at least one actuator is disposed on the base, one end of the at least one actuator is connected to the carrier to drive the optical element on the carrier to swing relative to the base, and an orthographic projection area of the at least one actuator on a reference plane does not overlap with an orthographic projection area of the active display surface.

15 Claims, 4 Drawing Sheets

PROJECTION APPARATUS AND IMAGING MODULE THEREOF

CROSS-REFERENCE TO RELATED APPLICATION

THIS APPLICATION CLAIMS THE PRIORITY BENEFIT OF CHINA APPLICATION CN201810693754.8 FILED ON 2018 Jun. 29. THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a projection apparatus and an imaging module thereof, and more particularly to a projection apparatus and an imaging module having an image displacement device.

BACKGROUND OF THE INVENTION

A projection apparatus is a device that can project an image onto a projection screen for presentation to a user. The image presented on the projection screen can have a finer image quality when the resolution of the image projected by the projection apparatus is increased. In addition to the common images of 1080P (1920×1080 pixels), images of 4K (3840×2160 pixels) or more have become more popular in recent years. Therefore, the manufacturers work hard for improving the resolution of the projection apparatus.

For increasing the resolution of the projection apparatus, generally a larger high-resolution imaging element (such as LCD, DMD, LCoS, etc.) or an additional component is employed. However, these practices may increase the size of the projection apparatus, and the associated optical or mechanical components must also become larger, resulting in increased cost and volume. Therefore, how to reduce the volume of the projection apparatus at the same time when improving the resolution of the projection apparatus is a focus of attention of those skilled in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an imaging module, which provides an arrangement effectively reducing the distance between the display element and the optical element of the image displacement device, thereby reducing the cost and downsizing the projection apparatus using the imaging module.

The invention further provides a projection apparatus having a more compacted size.

Other objectives and advantages of the invention can be further illustrated by the technical features broadly embodied and described as follows.

In order to achieve one or a part or all of the above or other objectives, an embodiment of the invention provides an imaging module, which includes a display element and an image displacement device. The display element includes an active display surface, and the active display surface is adapted to receive an illumination beam and convert the illumination beam into an image beam, and the image beam is transmitted by the active display surface. The image displacement device includes an optical element, a carrier, a base, and at least one actuator. The optical element is disposed on the carrier. The optical element is located on a transmission path of the image beam and is adapted to allow the image beam to pass therethrough. The at least one actuator is disposed on the base. One end of the at least one actuator is connected to the carrier to drive the optical element on the carrier to swing relative to the base. A plane where the active display surface is located is a reference plane. An orthographic projection area of the at least one actuator on the reference plane does not overlap with an orthographic projection area of the active display surface.

In order to achieve one or a part or all of the above or other objectives, an embodiment of the invention provides a projection apparatus, which includes an illumination system, a projection lens and an imaging module. The illumination system is adapted to provide an illumination beam. The imaging module includes a display element and an image displacement device. The display element includes an active display surface, and the active display surface is adapted to receive an illumination beam and convert the illumination beam into an image beam, and the image beam is transmitted by the active display surface. The image displacement device includes an optical element, a carrier, a base, and at least one actuator. The optical element is disposed on the carrier. The optical element is located on a transmission path of the image beam and is adapted to allow the image beam to pass therethrough. The image beam passes through the optical element and is transmitted to the projection lens. The at least one actuator is disposed on the base. One end of the at least one actuator is connected to the carrier to drive the optical element on the carrier to swing relative to the base. A plane on which the active display surface is located is a reference plane. An orthographic projection area of the at least one actuator on the reference plane does not overlap with an orthographic projection area of the active display surface.

In summary, the imaging module of the embodiment of the invention can greatly reduce the distance from the display element to the optical element, and thus the rear focus distance of the projection apparatus using the imaging module can be greatly reduced. Therefore, the volume and cost of the projection apparatus can be reduced, and the optical quality of the projection apparatus can also be improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
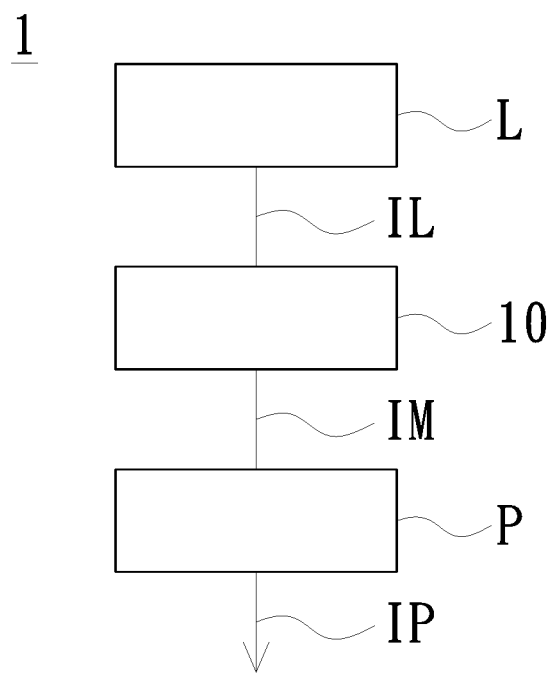
FIG. 1 is a schematic view of a projection apparatus according to an embodiment of the invention.

Please refer to FIG. 1. FIG. 1 is a schematic view of a projection apparatus according to an embodiment of the invention. The projection apparatus 1 includes an illumination system L, an imaging module 10 and a projection lens P. The imaging module 10 is disposed on a transmission path of an illumination beam IL provided by the illumination system L and is adapted to convert the illumination beam IL into an image beam IM. The projection lens P is disposed on a transmission path of the image beam IM. The image beam IM is for forming a projection beam IP after passing through the projection lens P, thereby forming an image frame on a projection surface. FIG. 1 is exemplified by one imaging module 10; however, the number of imaging modules 10 may be plural in other embodiments. The illumination system L may include, for example, a high pressure mercury lamp, a laser diode, or a light emitting diode to generate the illumination beam IL, but the invention is not limited thereto.

Figure 2A:
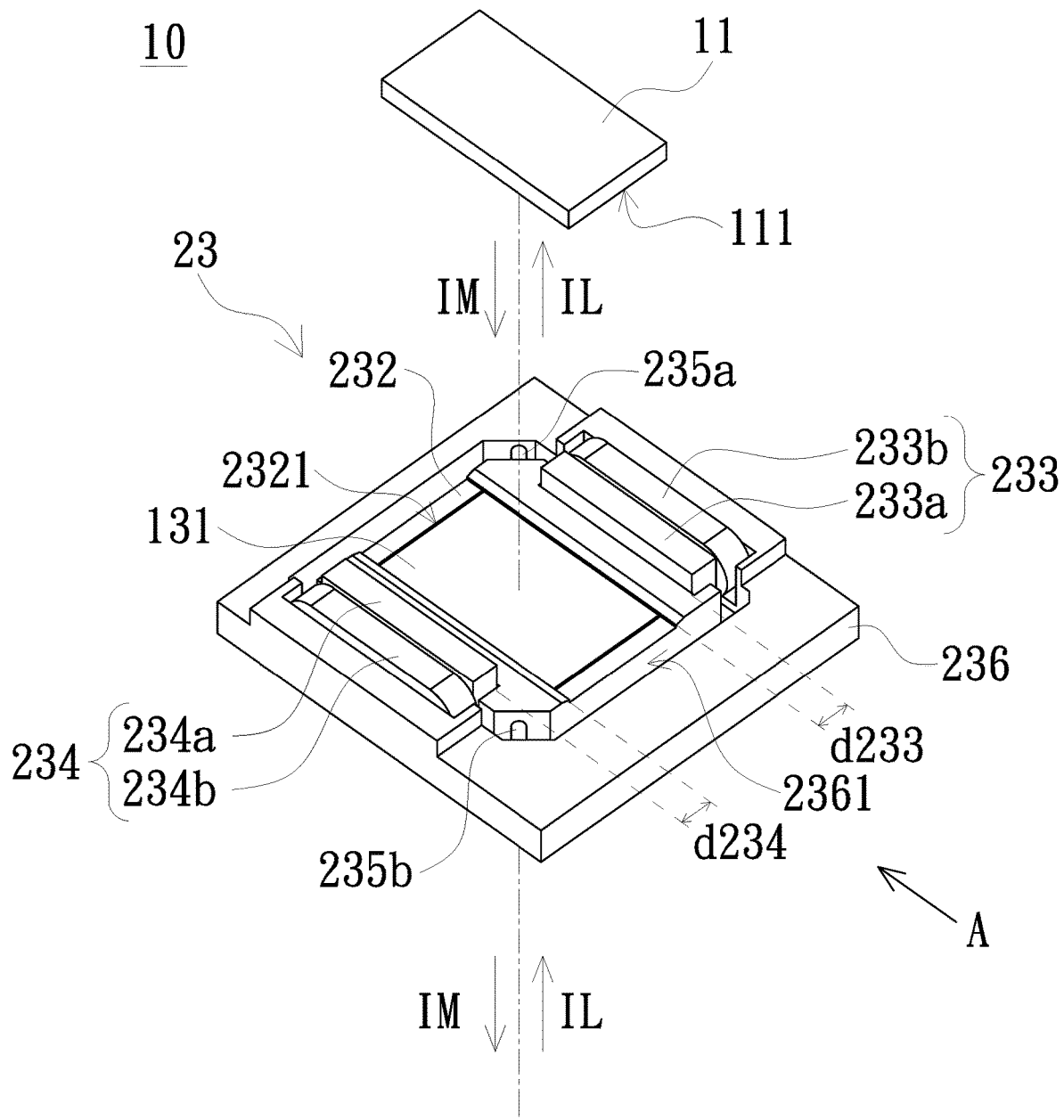
FIGS. 2A-2C are schematic views of an imaging module according to an embodiment of the invention.
Figure 2B:
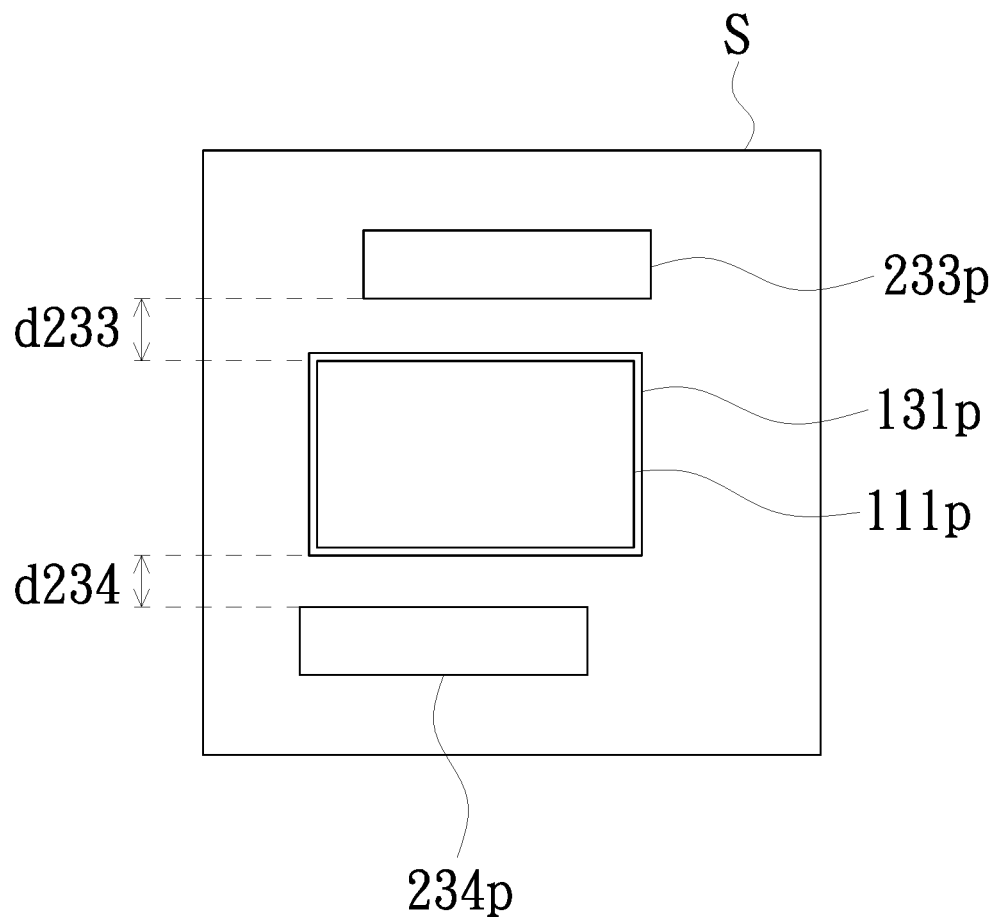
Figure 2C:
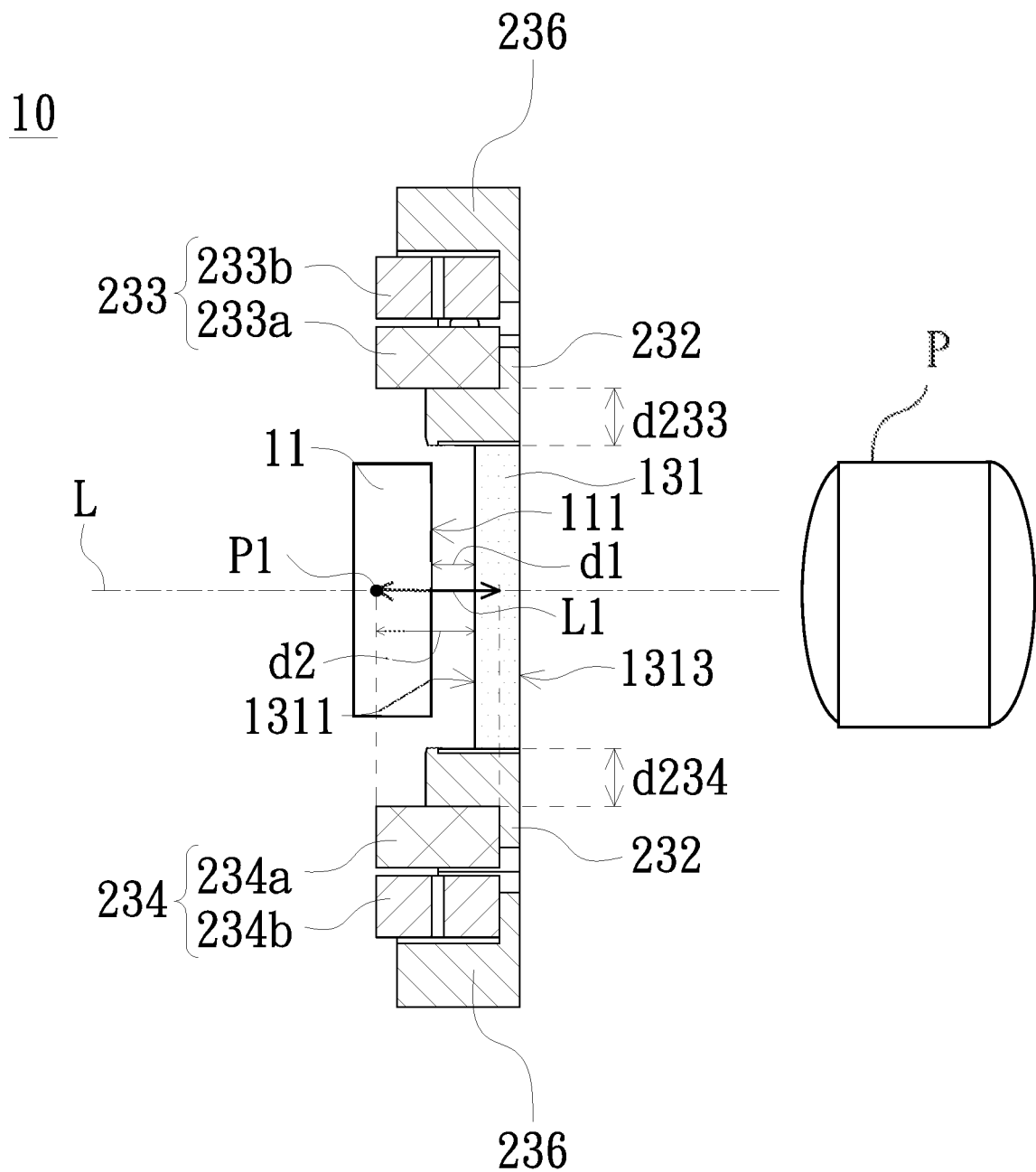

Referring to FIGS. 2A-2C together. FIGS. 2A-2C are schematic views of the imaging module 10 shown in FIG. 1.

Specifically, FIG. 2A is an exploded view of a display element and an image displacement device; FIG. 2B is a schematic view of a front projection of the relative positions of some components of the imaging module 10; and FIG. 2C is a cross-sectional side view of the imaging module 10. As shown in FIG. 2A, the imaging module 10 of the embodiment includes a display element 11 and an image displacement device 23. The imaging module 10 is located on a transmission path of the image beam IM. The image displacement device 23 is disposed between the display element 11 and the projection lens P. The display element 11 includes an active display surface 111. The active display surface 111 is adapted to receive the illumination beam IL, convert the illumination beam IL into the image beam IM, and reflect the image beam IM. In other embodiments, the display element 11 is a transmissive display element, such as a light transmissive liquid crystal panel, and accordingly the active display surface 111 is adapted to receive the illumination beam IL, convert the illumination beam IL into the image beam IM, and transmit the image beam IM to the image displacement device 23. In the embodiment, the image displacement device 23 includes an optical element 131, a carrier 232, a base 236, and actuators 233 and 234. The optical element 131 is disposed on the carrier 232. The optical element 131 is located on the transmission path of the image beam IM and is adapted to allow the image beam IM to pass therethrough. The embodiment is exemplified by two actuators, but the invention is not limited thereto. In other embodiments, the same effect may also be achieved by employing only one actuator or four actuators. In the embodiment, the actuators 233 and 234 are disposed on the base 236, wherein the base 236 is fixed in the projection apparatus 1. One end of the actuator 233 and one end of the actuator 234 are respectively connected to the carrier 232 to drive the optical element 131 on the carrier 232 to swing relative to the base 236, so that the optical element 131 changes the image characteristics of the image beam IM, specifically, changes the optical path of the image beam IM. Therefore, by the arrangement of the image displacement device 23, the image resolution of the projection apparatus 1 or the image quality of the projected image frame can be improved, for example, but the invention is not limited thereto.

FIG. 2B is a schematic orthographic projection view of the relative positions of some of the components of the imaging module. As shown in FIG. 2B, as viewed in the direction from the projection lens P to the display element 11, the plane where the active display surface 111 of the display element 11 is located is defined as a reference plane S. The orthographic projection of the active display surface 111 on the reference plane S is the area of the active display surface 111$p$; the orthographic projection of the optical element 131 on the reference plane S is the area of the optical element 131$p$; the orthographic projection of the actuator 233 on the reference plane S is the area of the actuator 233$p$; and the orthographic projection of the actuator 234 on the reference plane S is the area of the actuator 234$p$. In the embodiment, a size of the area of optical element 131$p$ is larger than a size of the area of active display surface 111$p$, so that the optical path of the all image beam IM transmitted from the active display surface 111 can be changed by the optical element 131. In the embodiment, the areas of actuators 233$p$ and 234$p$ of the orthographic projections of the actuators 233 and 234 on the reference plane S do not overlap with the area of active display surface 111$p$, that is, the actuators 233 and 234 do not overlap or have mechanism interference with the active display surface 111, wherein it is to be noted that the aforementioned so-called overlap includes partial overlap. Therefore, the display element 11 can be as close as possible to the optical element 131 without being blocked by the actuator 233 or 234. As such, the active display surface 111 can be close to the optical element 131, so that the volume of the imaging module 10 can be greatly reduced, and thereby reducing the cost and compacting the size of the projection apparatus 1.

FIG. 2C is a side view of the imaging module viewed in the direction A in FIG. 2A. As shown in FIG. 2C, in detail, the distance from the active display surface 111 of the display element 11 to the optical element 131 is the first distance d1. The normal line of the center of the active display surface 111 is defined as the reference line L. The orthographic projection of the actuator 233 or 234 on the reference line L is the line segment L1, and the end point of the line segment L1 adjacent to the display element 11 and away from the optical element 131 is the reference point P1. The distance from the reference point P1 to the optical element 131 is the second distance d2. In the embodiment, the first distance d1 is smaller than the second distance d2. As shown in FIG. 2B, by the design of the carrier 232, the area of actuator 233p and the area of active display surface 111p have a length d233 between them, and the area of actuator 234p and the area of active display surface 111p have a length d234 between them. The areas of actuators 233p and 234p of the actuators 233 and 234 have a sufficient distant therebetween the area of active display surface 111p of the active display surface 111, that is, the lengths d233 and d234 are long enough, so that the active display surface 111 does not overlap or contact with the actuators 233 and 234. From FIG. 2C, it is known that since the actuators 233 and 234 have a certain distance therebetween the optical element 131 and the display element 11, the display element 11 can be as close as possible to the optical element 131 without being blocked by or having mechanism interference with the actuator 233 or 234. Therefore, the rear focus distance of the projection apparatus 1 (i.e., the distance from the active display surface 111 to the projection lens P) can be greatly reduced. The smaller rear focus distance can reduce the cost and compact the size of the projection apparatus 1. Specifically, a projection lens P with smaller size (a lens using a smaller effective light diameter) can be used, and the optical quality of the projection apparatus 1 can also be improved. It is to be noted that the rear focus distance is the distance between the active display surface 111 and the projection lens P. On the transmission path of the image beam IM, other light transmission elements, such as prism or mirror, may be disposed between the active display surface 111 and the projection lens P to transmit the image beam IM to the projection lens P.

The lengths d233 and d234 shown in FIGS. 2B and 2C are only an example, and the invention is limited thereto. The lengths d233 and d234 may be any value as long as that the areas of actuator 233p and 234p of the orthographic projections of the actuators 233 and 234 on the reference plane S do not overlap the area of active display surface 111p of the active display surface 111.

In detail, the optical element 131 includes a flat glass. The flat glass includes a light incident surface 1311 and a light exit surface 1313, and the light incident surface 1311 is opposite to the light exit surface 1313. The image beam IM formed by the display element 11 is incident on the optical element 131 through the light incident surface 1311. When a reflective display element is used, the illumination beam IL is firstly incident on the optical element 131 through the light exit surface 1313 and then transmitted to the display element 11 through the light incident surface 1311. The light incident surface 1311 and the light exit surface 1313 are parallel to the active display surface 111 when the actuators 233 and 234 do not drive the optical element 131 on the carrier 232 to swing relative to the base 236. The light incident surface 1311 and the light exit surface 1313 are not parallel to the active display surface 111 when the actuators 233 and 234 drive the optical element 131 on the carrier 232 to swing relative to the base 236. Therefore, the optical element 131 can change the optical path of the image beam IM by configuring the actuators 233 and 234 to drive the optical element 131 to swing relative to the base 236. Thus, the image resolution of the projection apparatus 1 or the image quality of the image frame can be improved for example, but the invention is not limited thereto.

Specifically, the carrier 232 includes a first hollow region 2321, and the optical element 131 is disposed within the first hollow region 2321. The base 236 includes a second hollow region 2361, and the carrier 232 is located within the second hollowed region 2361. The structures and shapes of the carrier 232 and the base 236 shown in FIGS. 2A and 2C are merely examples, and the invention is not limited thereto.

Further, the light incident surface 1311 of the optical element 131 and the active display surface 111 of the display element 11 may be, for example, rectangular. As shown in FIG. 2B, in the embodiment, the area of the light incident surface 1311 is larger than the area of the active display surface 111. Therefore, by the design of the carrier 232, the lengths d233 and d234 can be long enough, so that the areas of actuators 233p and 234p of the actuators 233 and 234 have a sufficient distance therebetween the area of the active display surface 111p, and accordingly the area of active display surface 111p of the active display surface 111 does not overlap or contact with the areas of actuators 233p and 234p. Without increasing the area of the optical element 131, the display element 11 can be as close as possible to the optical element 131 without being blocked by or having mechanism interference with the actuator 233 or 234. Therefore, the rear focus distance of the projection apparatus 1 can be greatly reduced without increasing the cost of the optical element.

It should be noted that the embodiment is exemplified by that the image displacement device 23 is disposed with two actuators 233 and 234, but the invention does not limit the number and position of the actuators included in the image displacement device 23. The image displacement device 23 may include at least one actuator, and the actuator may have any configuration as long as it can drive the carrier 232 to swing without blocking the display element 11. In addition, the actuators 233 and 234 may be, for example, a voice coil motor (VCM) or a piezoelectric ceramic device, and the invention is not limited thereto. In the embodiment, the actuator 233 includes, for example, a magnet 233a and a coil 233b. In the embodiment, the coil 233b is disposed on the base 236 and the magnet 233a is connected to the carrier 232 as an example. Therefore, the actuator 233 can drive the carrier 232 to swing while in operation. In other embodiments of the invention, the magnet of the actuator may be disposed on the base 236 and the coil of the actuator may be connected to the carrier 232, and the invention is not limited thereto. The actuator 234 includes a magnet 234a and a coil 234b. The actuator 234 is similar to the actuator 233 in function and implementation, and no redundant detail is to be given herein.

Specifically, the carrier 232 and the base 236 may be connected to each other by the elastic members 235a and 235b, for example. The elastic members 235a and 235b are adapted to fix the carrier 232 and the base 236. The elastic members 235a and 235b can be correspondingly elastically rotated when the actuators 233 and 234 drive the carrier 232 to swing relative to the base 236. However, the invention does not limit the material, structure, installation position or number of the elastic members 235a and 235b.

Further, the display element 11 of the projection apparatus 1 may be, for example, a digital micromirror device (DMD) or a liquid crystal on silicon (LCoS) display element. In addition, the display element 11 may be, for example, a transmissive spatial light modulator, such as a transparent liquid crystal panel. In addition, depending on the manner of the input control signal, the aforementioned light modulator may be, for example, an optically addressed spatial light modulator (OASLM) or an electrically addressed spatial light modulator (EASLM). The invention does not limit the type and category of the display element 11. The active display surface 111 of the display element 11 refers to a surface to generate the beam modulation by the display element 11 based on an electrical signal, and the active display surface 111 allows the illumination beam IL to form an image beam IM.

In summary, the imaging module of the embodiment of the invention can greatly reduce the distance from the display element to the optical element, and thus the rear focus distance of the projection apparatus using the imaging module can be greatly reduced. Therefore, the size and cost of the projection apparatus can be compacted and reduced, and the optical quality of the projection apparatus can also be improved. In addition, in order to avoid the problem of mechanism interference caused when the display element is closer to the optical element of the image displacement device, the imaging module of the invention moves at least one actuator away from the optical element without changing the size of the optical element of the prior design. In other embodiments, if a plurality of actuators is employed, the actuators may move outwardly toward the sides (e.g., four sides) of the optical element.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An imaging module, comprising:
a display element, comprising an active display surface, the active display surface adapted to receive an illumination beam and convert the illumination beam into an image beam, and the image beam transmitted by the active display surface; and
an image displacement device, comprising an optical element, a carrier, a base and at least one actuator, wherein the optical element is disposed on the carrier, the optical element is located on a transmission path of the image beam and is adapted to allow the image beam to pass therethrough, the at least one actuator is disposed on the base, one end of the at least one actuator is connected to the carrier to drive the optical element on the carrier to swing relative to the base, a plane where the active display surface is located is a reference plane, and an orthographic projection area of the at least one actuator on the reference plane does not overlap with an orthographic projection area of the active display surface,
wherein a distance from the active display surface to the optical element is a first distance, a normal line of a center of the active display surface is a reference line, an orthographic projection of the at least one actuator on the reference line is a line segment, an end point of the line segment adjacent to the display element and away from the optical element is a reference point, a distance from the reference point to the optical element is a second distance, and the first distance is less than the second distance.

2. The imaging module according to claim 1, wherein the optical element comprises a flat glass, the flat glass comprises a light incident surface and a light exiting surface, the light incident surface is opposite to the light exiting surface, the image beam is incident on the optical element through the light incident surface, the light incident surface and the light exit surface are parallel to the active display surface when the at least one actuator does not drive the optical element on the carrier to swing relative to the base, and the light incident surface and the light exit surface are not parallel to the active display surface when the at least one actuator drives the optical element on the carrier to swing relative to the base.

3. The imaging module according to claim 2, wherein the light incident surface and the active display surface are rectangular.

4. The imaging module according to claim 3, wherein an area of the light incident surface is larger than an area of the active display surface.

5. The imaging module according to claim 1, wherein the carrier comprises a first hollow region, the optical element is disposed within the first hollow region, the base comprises a second hollow region, and the carrier is located in the second hollow region.

6. The imaging module according to claim 1, wherein the at least one actuator is a voice coil actuator or a piezoelectric ceramic device.

7. The imaging module according to claim 1, wherein the at least one actuator comprises a magnet and a coil, wherein the magnet is disposed on the base and the coil is connected to the carrier, or, the coil is disposed on the base and the magnet is connected to the carrier.

8. The imaging module according to claim 1, wherein the display element is a digital micro mirror device, a liquid crystal silicon display device, or a light transmissive liquid crystal panel.

9. A projection apparatus, comprising:
   an illumination system, adapted to provide an illumination beam; and
   an imaging module, comprising:
      an display element, comprising an active display surface, wherein the active display surface is adapted to receive an illumination beam and convert the illumination beam into an image beam, and the image beam is transmitted by the active display surface; and
      an image displacement device, comprising an optical element, a carrier, a base and at least one actuator, wherein the optical element is disposed on the carrier, the optical element is located on a transmission path of the image beam and is adapted to allow the image beam to pass therethrough, the image beam passes through the optical element and is transmitted to a projection lens, the at least one actuator is disposed on the base, one end of the at least one actuator is connected to the carrier to drive the optical element on the carrier to swing relative to the base, a plane where the active display surface is located is a reference plane, and an orthographic projection area of the at least one actuator on the reference plane does not overlap with an orthographic projection area of the active display surface,
   wherein a distance from the active display surface to the optical element is a first distance, a normal line of a center of the active display surface is a reference line, an orthographic projection of the at least one actuator on the reference line is a line segment, an end point of the line segment adjacent to the display element and away from the optical element is a reference point, a distance from the reference point to the optical element is a second distance, and the first distance is less than the second distance.

10. The projection apparatus according to claim 9, wherein the optical element comprises a flat glass, the flat glass comprises a light incident surface and a light exiting surface, the light incident surface is opposite to the light exiting surface, the image beam is incident on the optical element through the light incident surface, the light incident surface and the light exit surface are parallel to the active display surface when the at least one actuator does not drive the optical element on the carrier to swing relative to the base, and the light incident surface and the light exit surface are not parallel to the active display surface when the at least one actuator drives the optical element on the carrier to swing relative to the base.

11. The projection apparatus according to claim 10, wherein the light incident surface and the active display surface are rectangular.

12. The projection apparatus according to claim 11, wherein an area of the light incident surface is larger than an area of the active display surface.

13. The projection apparatus according to claim 9, wherein the carrier comprises a first hollow region, the optical element is disposed within the first hollow region, the base comprises a second hollow region, and the carrier is located in the second hollow region.

14. The projection apparatus according to claim 9, wherein the at least one actuator is a voice coil actuator or a piezoelectric ceramic device.

15. The projection apparatus according to claim 9, wherein the at least one actuator comprises a magnet and a coil, wherein the magnet is disposed on the base and the coil is connected to the carrier, or, the coil is disposed on the base and the magnet is connected to the carrier.

* * * * *